United States Patent
Hoshi

(10) Patent No.: US 7,106,521 B2
(45) Date of Patent: Sep. 12, 2006

(54) ZOOM LENS AND CAMERA WITH THE ZOOM LENS

(75) Inventor: Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 10/255,397

(22) Filed: Sep. 26, 2002

(65) Prior Publication Data

US 2003/0072087 A1 Apr. 17, 2003

(30) Foreign Application Priority Data

Sep. 28, 2001 (JP) .................................. 2001-300356

(51) Int. Cl.
G02B 15/14 (2006.01)

(52) U.S. Cl. .................................................. 359/687
(58) Field of Classification Search ................. 359/687; 351/687

See application file for complete search history.

(56) References Cited

U.S. PATENT DOCUMENTS

| | | | | |
|---|---|---|---|---|
| 4,240,700 A | | 12/1980 | Ogawa et al. ............... | 359/677 |
| 5,189,558 A | | 2/1993 | Ishii et al. | |
| 5,383,058 A | * | 1/1995 | Yonezawa .................... | 359/687 |
| 5,396,367 A | | 3/1995 | Ono et al. .................... | 359/687 |
| 5,572,364 A | | 11/1996 | Toide et al. ................. | 359/649 |
| 5,671,062 A | * | 9/1997 | Nakamura ................... | 359/687 |
| 6,101,043 A | * | 8/2000 | Kohno et al. ................ | 359/687 |
| 6,396,627 B1 | * | 5/2002 | Tachihara et al. ........... | 359/363 |

FOREIGN PATENT DOCUMENTS

| | | |
|---|---|---|
| JP | 54-30855 | 3/1979 |
| JP | 4-43311 | 2/1992 |
| JP | 4043311 | 2/1992 |
| JP | 4-171411 | 6/1992 |
| JP | 5-34597 | 2/1993 |
| JP | 05027167 A * | 2/1993 |
| JP | 05-093862 | 4/1993 |
| JP | 05093862 A * | 4/1993 |
| JP | 8-304700 | 11/1996 |
| JP | 10-62689 | 3/1998 |
| JP | 11052236 | 2/1999 |
| JP | 11-242158 | 9/1999 |
| JP | 11-242159 | 9/1999 |
| JP | 11-311743 | 11/1999 |
| JP | 11-337823 | 12/1999 |
| JP | 2000-121940 | 4/2000 |
| JP | 2000-121941 | 4/2000 |
| JP | 2001-221948 | 8/2001 |
| JP | 2001-228395 | 8/2001 |

OTHER PUBLICATIONS

English translation of JP05–093862.
A Notification of Reason for Rejection issued from Japanese Patent Office for Japanese application No. JP 2001–300356 dated May 11, 2004.
English translation of the Notification of Reason for Rejection issued from the Japanese Patent Office for Japanese application No. JP 2001–300356 dated May 11, 2004.
A Communication issued from the Korean Patent Office for Korean application No. 10–2002–0058631; and.
Japanese translation of the Communication issued from the Korean Patent Office for Korean application No. 10–2002–0058631.
An office action from Chinese Patent Office dated Mar. 5, 2004 for Application No. 02132340.2 no translation.
An Office Action from Japanese Patent Office for application No. 2001–300356 issued on Aug. 5, 2004.
English translation of the Japanese Office Action for application No. 2001–300356 issued on Aug. 5, 2004.
English translation of JPLO 5–34597.

* cited by examiner

*Primary Examiner*—Scott J. Sugarman
(74) *Attorney, Agent, or Firm*—Morgan & Finnegan, L.L.P.

(57) ABSTRACT

A zoom lens includes a first lens unit which does not move for zooming and has positive optical power, a second lens unit having negative optical power, a third lens unit having positive optical power, and a fourth lens unit having positive optical power, these lens unit being arranged in order from the object side to the image side. Due to this simple construction, it is possible to obtain high optical performance over the entire object distance from an object at infinity to a nearby object.

22 Claims, 13 Drawing Sheets

ZOOM LENS AND CAMERA WITH THE ZOOM LENS

BACKGROUND OF THE INVENTION

1. Field of the Invention

The present invention relates to a zoom lens, and more particularly, to a zoom lens used in an optical apparatus, such as a video camera, digital camera, or film camera.

2. Related Background Art

There has been available a so-called four-unit zoom lens consisting of lens units of positive-negative-positive-positive refractive powers as a lens system for use in an optical apparatus, such as a video camera or a digital still camera; it includes, in succession order from the object side, a first lens unit for zooming and focusing which is stationary and of positive refractive power, a second lens unit having negative refractive power and adapted to move on the optical axis to effect zooming, a third lens unit for zooming and focusing which is stationary and of positive refractive power, and a fourth lens unit of positive refractive power adapted to move on the optical axis for the purpose of correcting image plane fluctuation as a result of zooming and effecting focusing.

Japanese Patent Application Laid-Open No. 2000-121940, Japanese Patent Application Laid-Open No. 2000-121941, etc. propose a small-sized four-unit zoom lens of this type in which the first lens unit is composed of a junction lens consisting of negative and positive lenses and a positive lens.

Apart from this, four-unit zoom lenses of this type are proposed, for example, in Japanese Patent Application Laid-Open No. 4-43311 (corresponding to U.S. Pat No. 5,189,558), Japanese Patent Application Laid-Open No. 5-72472 (corresponding to U.S. Pat. No. 5,572,364), Japanese Patent Application Laid-Open No. 6-130297 (corresponding to U.S. Pat. No. 5,396,367), and Japanese Patent Application Laid-Open No. 8-304700.

Recently, there has been an increasing demand for a small and inexpensive zoom lens of high performance.

Generally speaking, in a zoom lens, by increasing the refractive powers of the lens units, the movement amount of each lens unit for achieving a predetermined zooming ratio is reduced, thereby making it possible to reduce the entire length of the lens.

However, simply increasing the refractive power of each lens unit involves an increase in fluctuation in aberration, with the result that it is difficult to obtain a satisfactory optical performance over the entire zooming range.

When adopting in a zoom lens a rear focusing system in which focusing is effected in the lens units other than the first unit, a reduction in the size of the entire lens system is achieved. On the other hand, this leads to an increase in fluctuation in aberration at the time of focusing, making it very difficult to obtain high optical performance over the entire object distance from an object at infinity to a close-range object.

SUMMARY OF THE INVENTION

It is an object of the present invention to provide a novel zoom lens in which the entire lens system is reduced in size and which provides high optical performance despite its simple construction.

To achieve the above object, there is provided, in accordance with the present invention, a zoom lens comprising, in succession order from the object side (front side) to the image side (rear side), a first lens unit which does not move for zooming and of positive optical power (The term "optical power" herein refers to the reciprocal of focal distance), a second lens unit which is movable for zooming and of negative optical power, a third lens unit which does not move for zooming and of positive optical power, and a fourth lens unit which is movable for zooming and of positive optical power.

And, in an aspect of the present invention, there is provided a zoom lens, wherein the first lens unit consists of one positive lens and one negative lens in that order from the object side to the image side, and wherein the fourth lens unit consists of one positive lens.

In another aspect of the invention, there is provided a zoom lens, wherein the first lens unit consists of one positive lens and one negative lens, and wherein the third lens unit includes at least one negative lens and at least one positive lens. And, the lens surfaces of the lenses of the first lens unit are all spherical surfaces, and the following conditions are satisfied:

$$1.60 < 1Gn < 1.84$$

$$1.67 < 3Gn < 1.89$$

where $1Gn$ is the refractive index of the material of the positive lens of the first lens unit, and $3Gn$ is the refractive index of the material of that positive lens of the third lens unit which is nearest to the object.

In further aspect of the invention, there is provided a zoom lens, wherein the first lens unit consists of one positive lens and one negative lens, and wherein the third lens unit includes a bi-concave negative lens and a bi-convex positive lens adjacent thereto on the object side. Further, the following condition is satisfied:

$$0.12 < 4BD/3BD < 0.71$$

where $3BD$ is the thickness of the third lens unit as measured on the optical axis, and $4BD$ is the thickness of the fourth lens unit as measured on the optical axis.

In still further aspect of the invention, there is provided a zoom lens, wherein the first lens unit consists of one positive lens and one negative lens, and wherein the following condition is satisfied:

$$0.42 < |f2|/LV < 0.91$$

where $f2$ is the focal distance of the second lens unit, and $LV$ is the distance between the first lens unit and the third lens unit.

DESCRIPTION OF THE PREFERRED EMBODIMENTS

Figure 1:
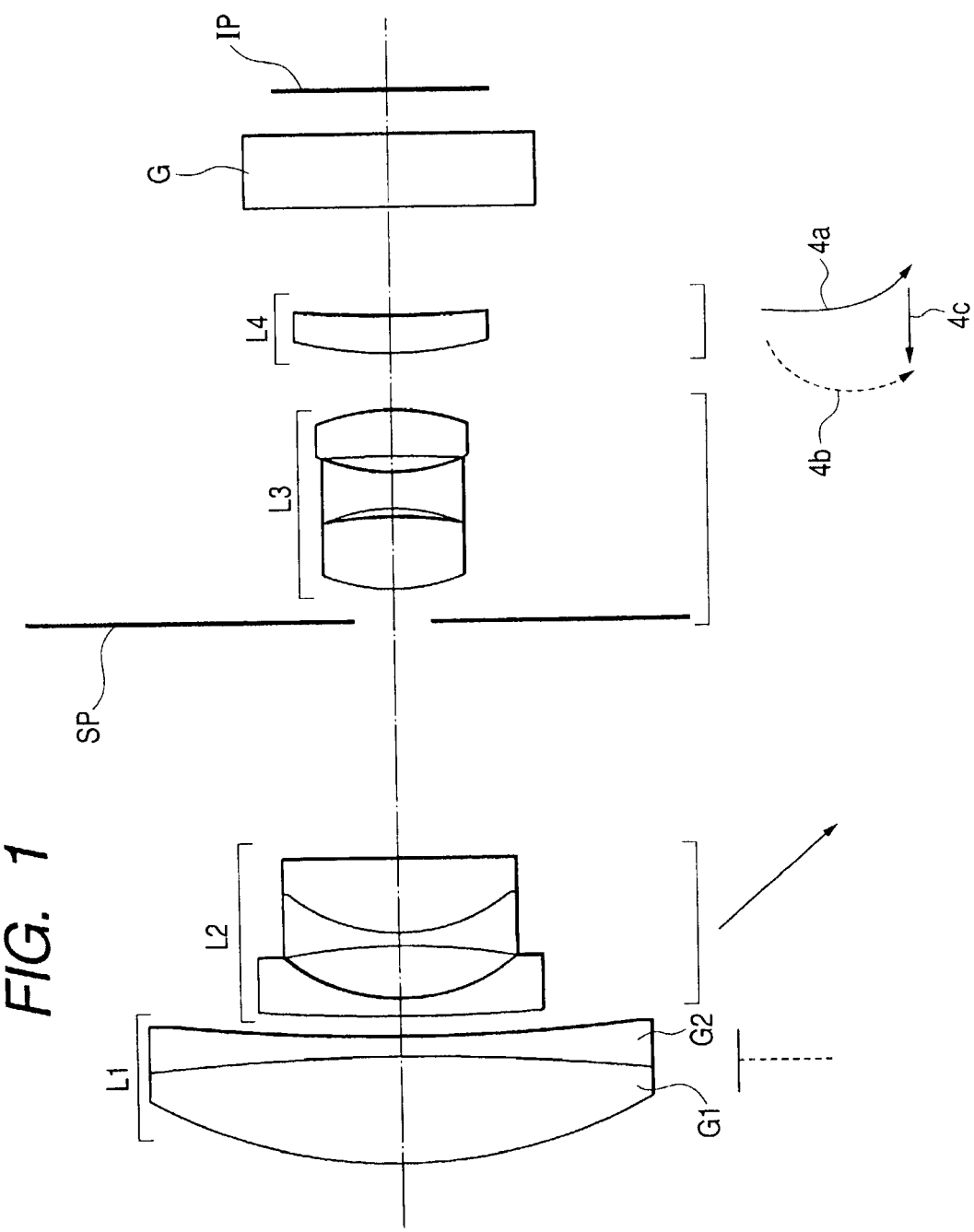
FIG. 1 is a sectional view of a zoom lens according to Embodiment 1.
Figure 2:
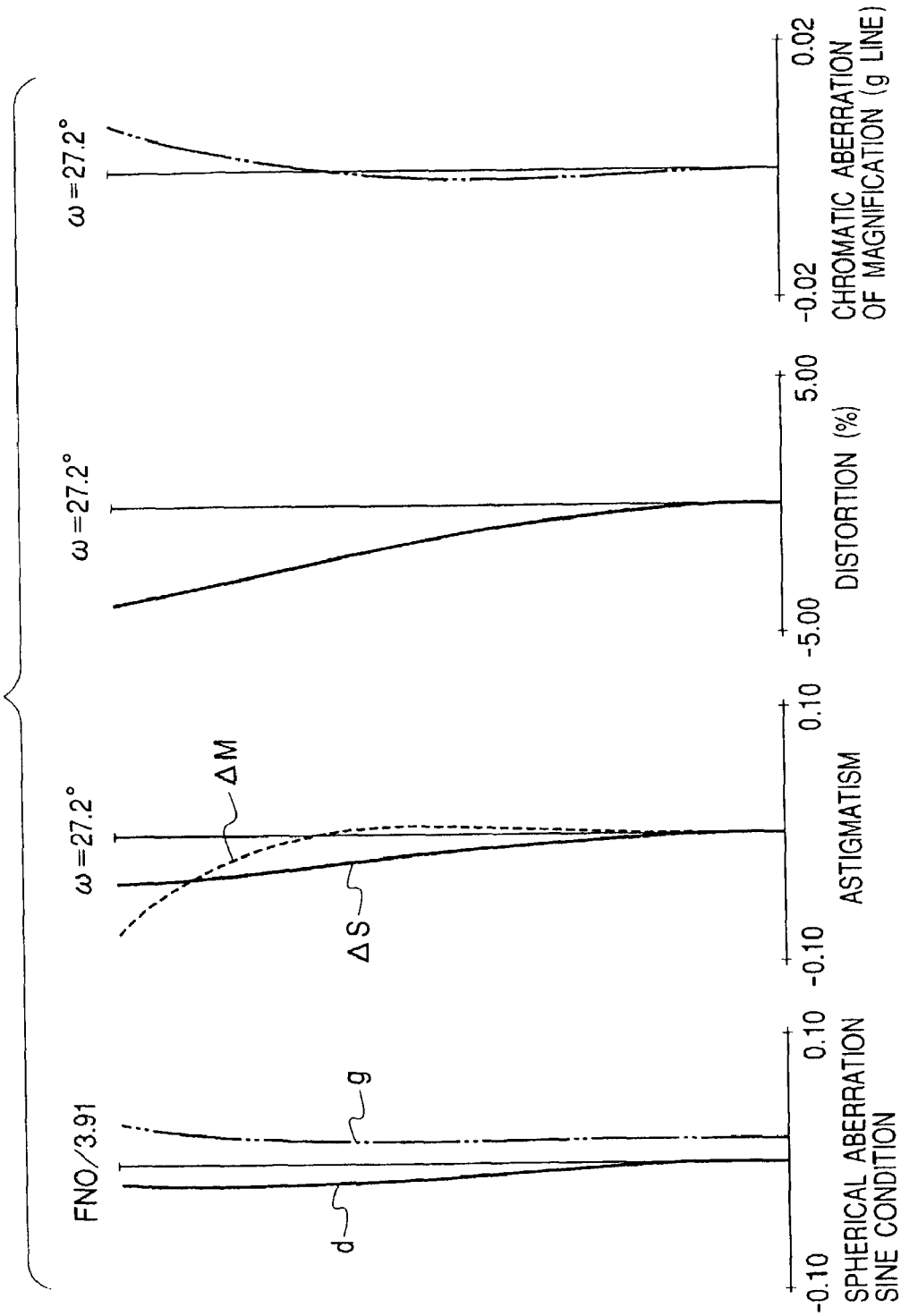
FIG. 2 is a diagram showing the aberration at the wide-angle end of the zoom lens of Embodiment 1.
Figure 3:
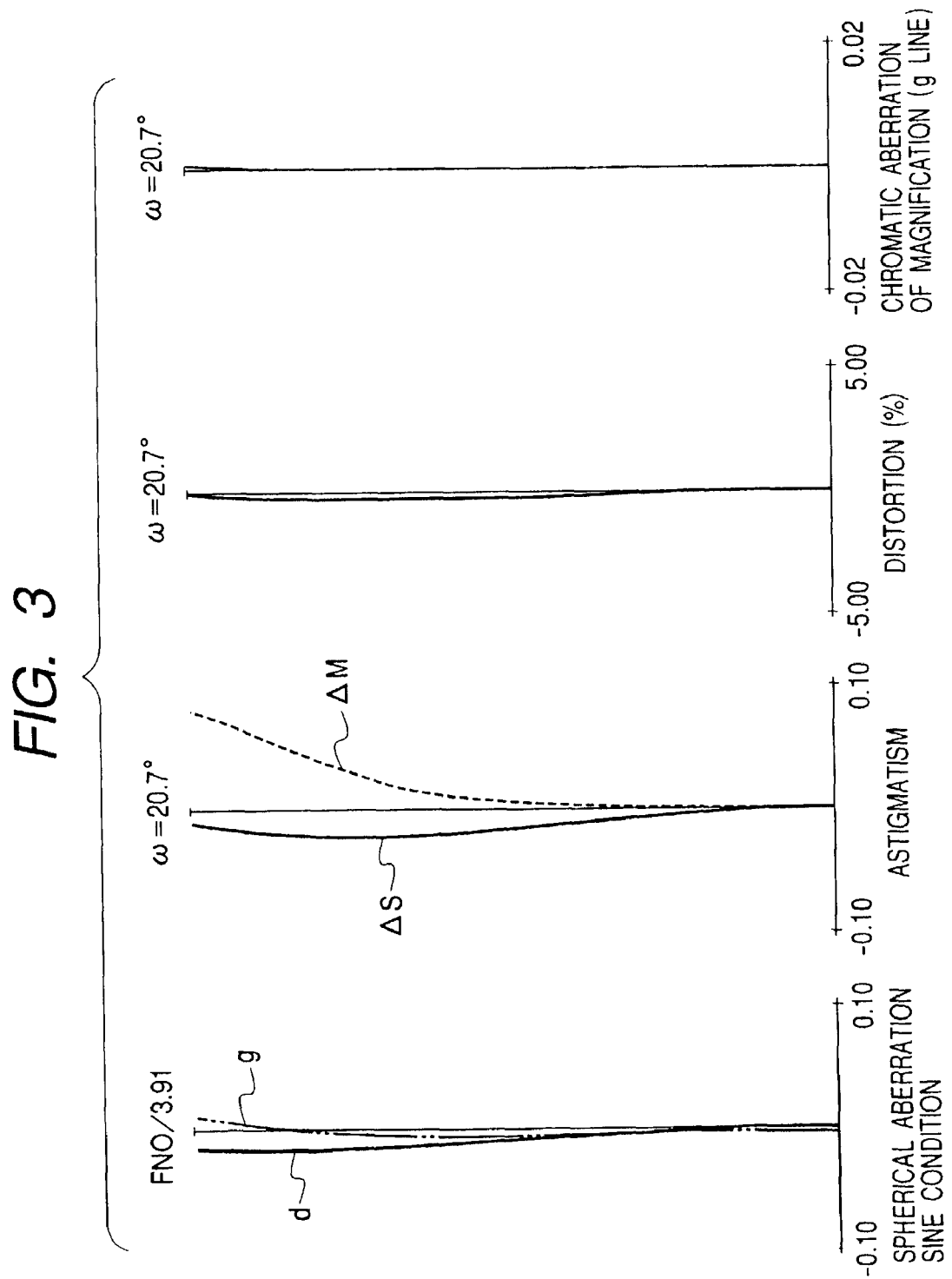
FIG. 3 is a diagram showing the aberration at the intermediate zooming position of the zoom lens of Embodiment 1.
Figure 4:
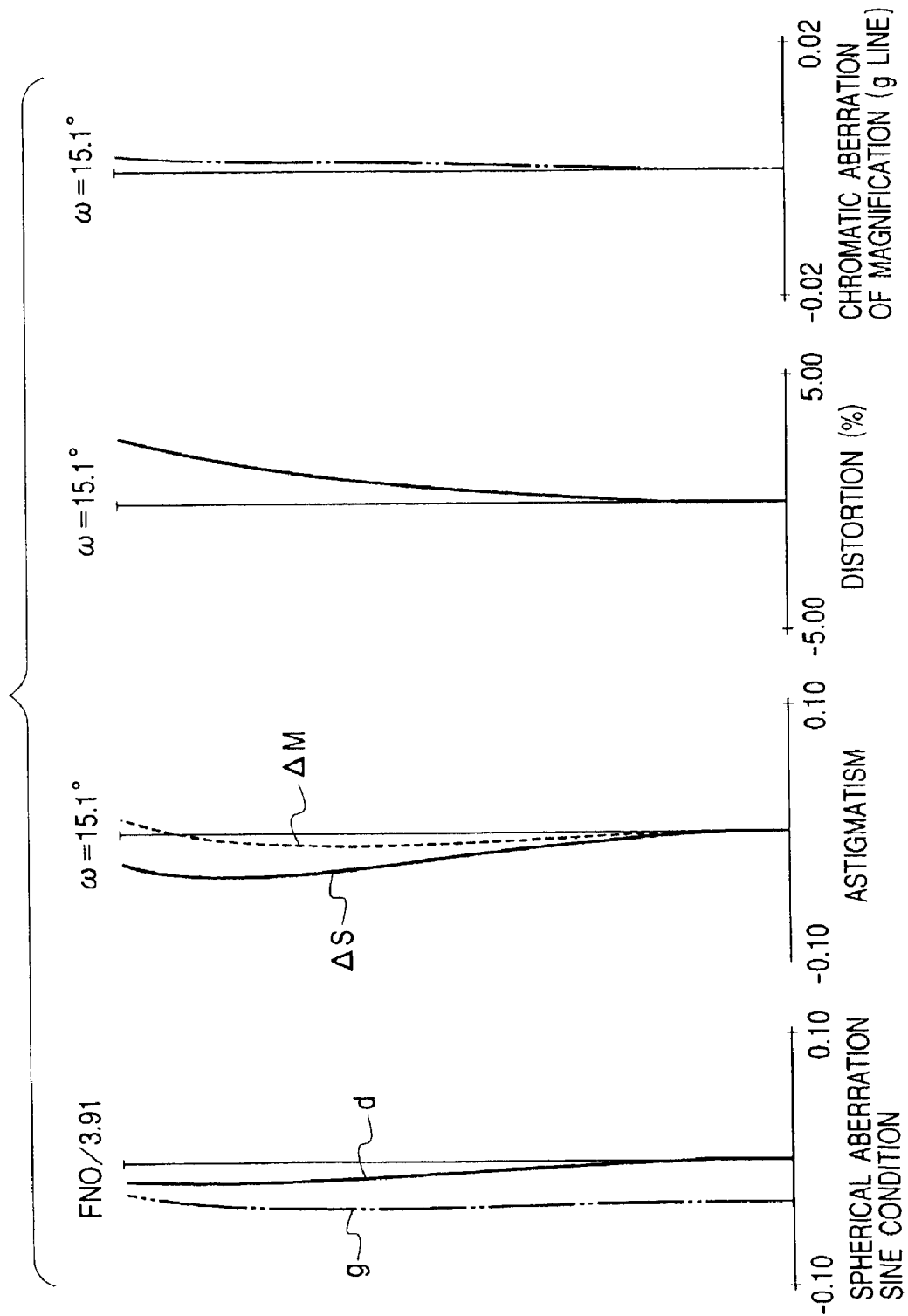
FIG. 4 is a diagram showing the aberration at the telephoto end of the zoom lens of Embodiment 1.

FIG. 1 is a sectional view showing a main portion of the zoom lens of Embodiment 1 of the present invention, and FIGS. 2 through 4 are diagrams showing the aberration at the wide-angle end, intermediate focal distance, and telephoto end of the zoom lens of Embodiment 1.

Figure 5:
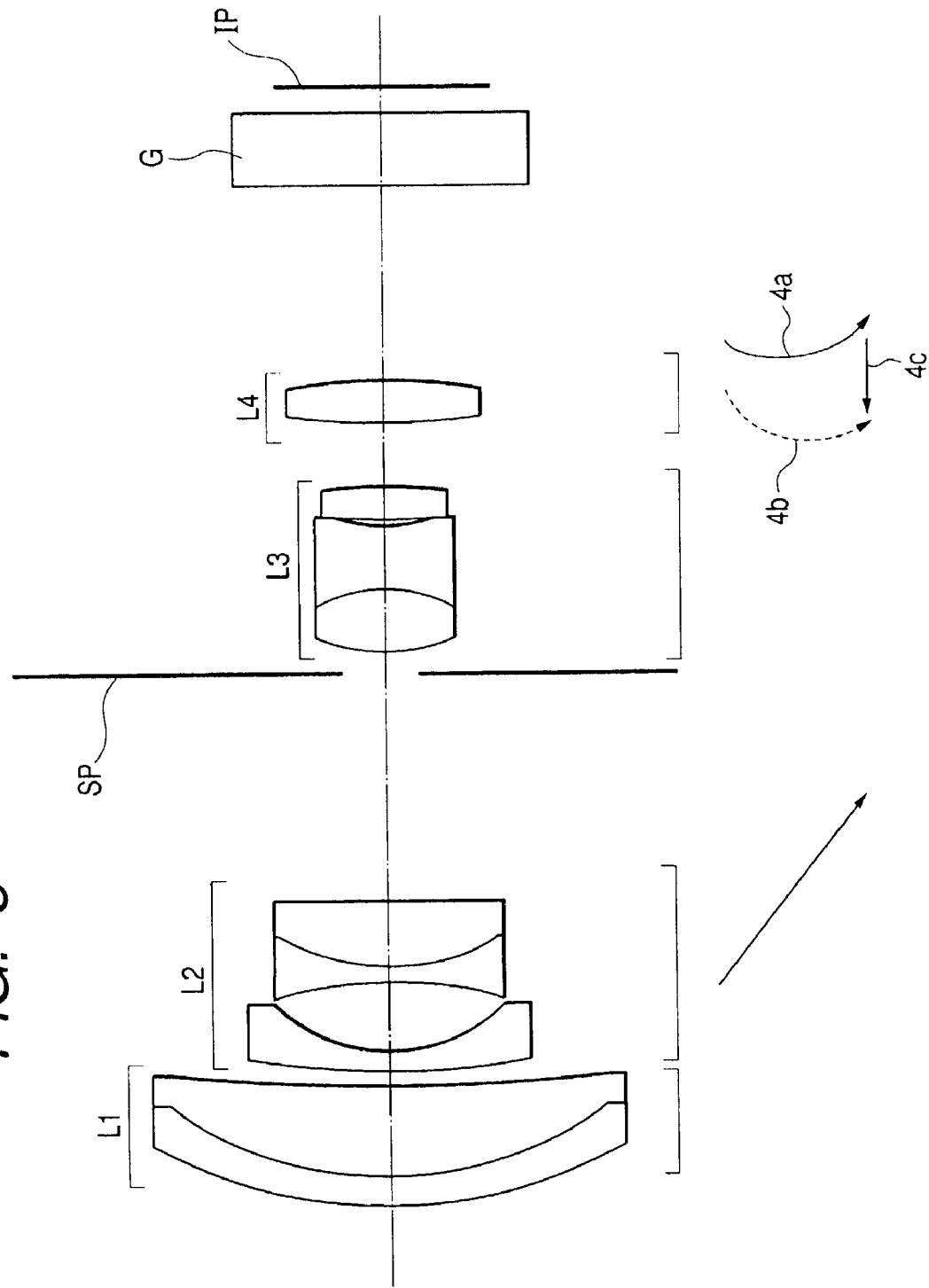
FIG. 5 is a sectional view of a zoom lens according to Embodiment 2.
Figure 6:
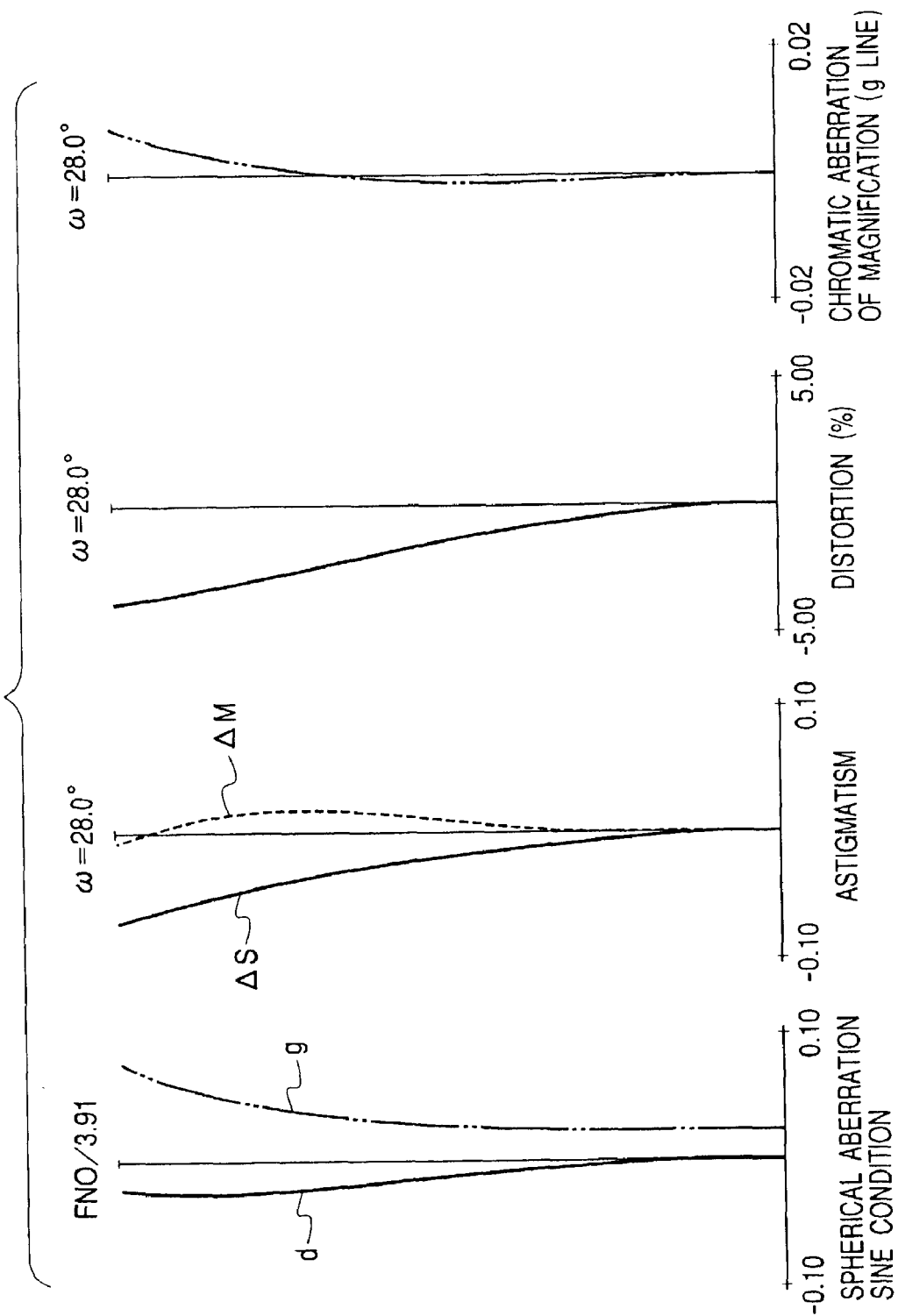
FIG. 6 is a diagram showing the aberration at the wide-angle end of the zoom lens of Embodiment 2.
Figure 7:
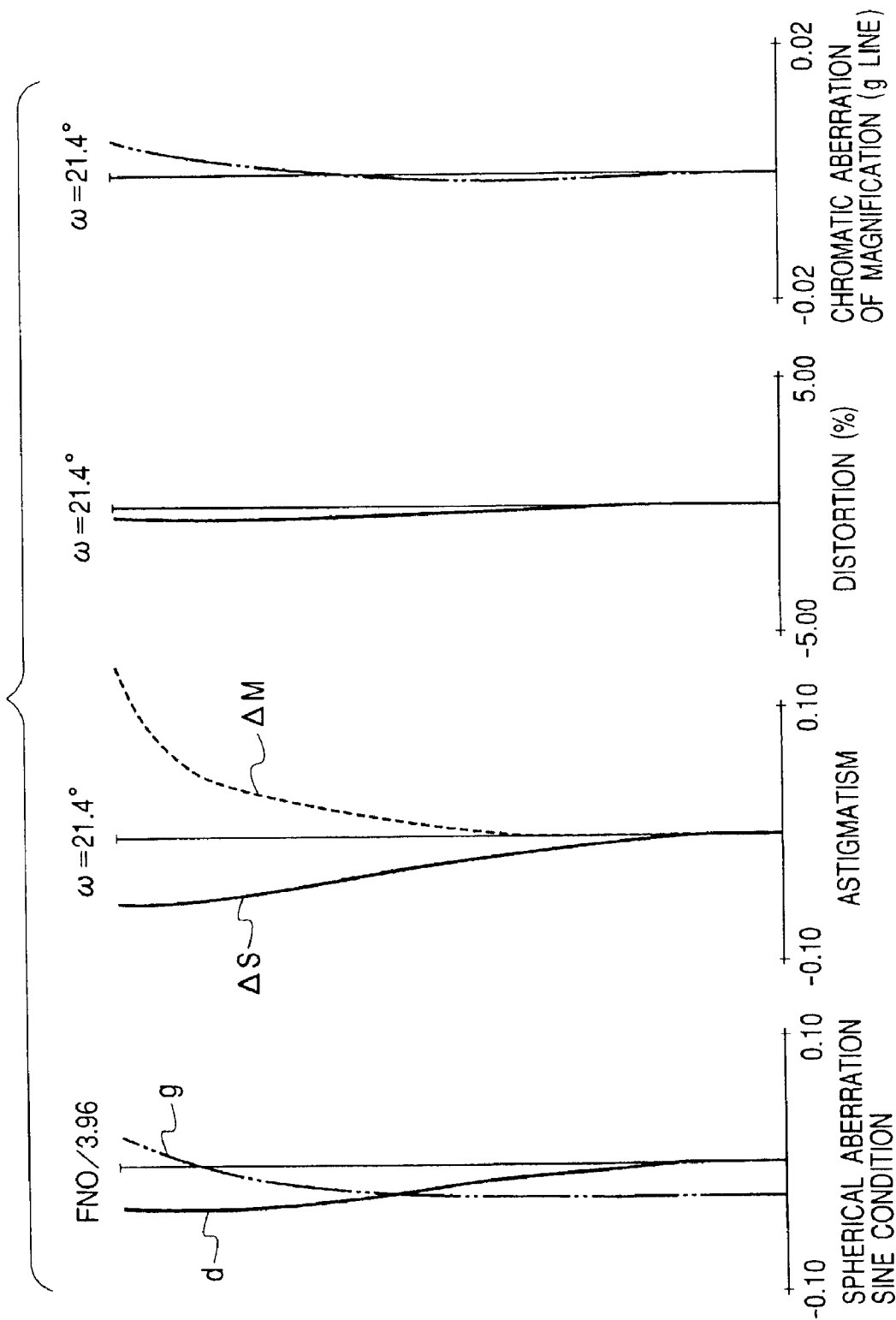
FIG. 7 is a diagram showing the aberration at the intermediate zooming position of the zoom lens of Embodiment 2.
Figure 8:
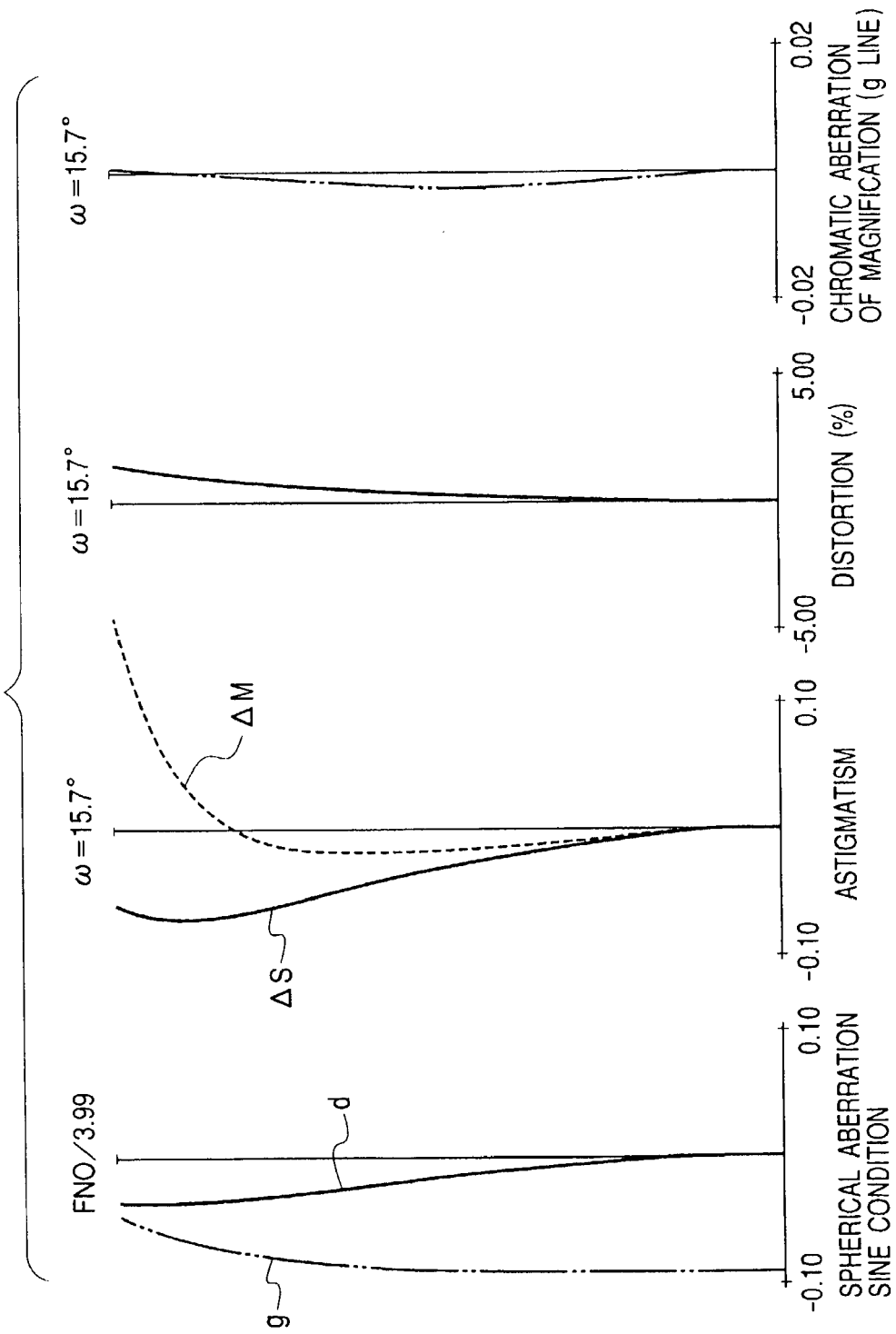
FIG. 8 is a diagram showing the aberration at the telephoto end of the zoom lens of Embodiment 2.

FIG. 5 is a sectional view showing a main portion of the zoom lens of Embodiment 2 of the present invention, and FIGS. 6 through 8 are diagrams showing the aberration at the wide-angle end, intermediate focal distance, and telephoto end of the zoom lens of Embodiment 2.

Figure 9:
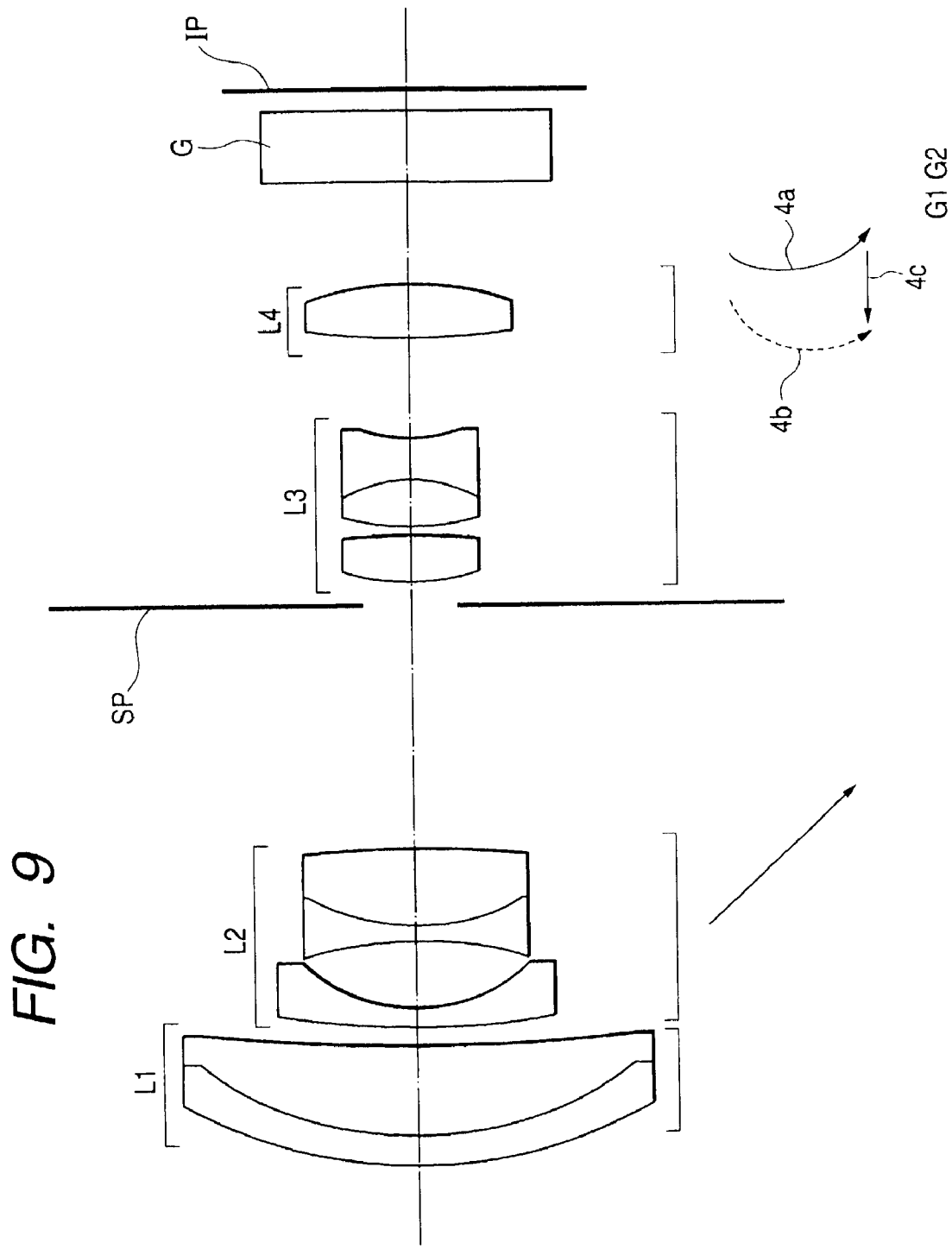
FIG. 9 is a sectional view of a zoom lens according to Embodiment 3.
Figure 10:
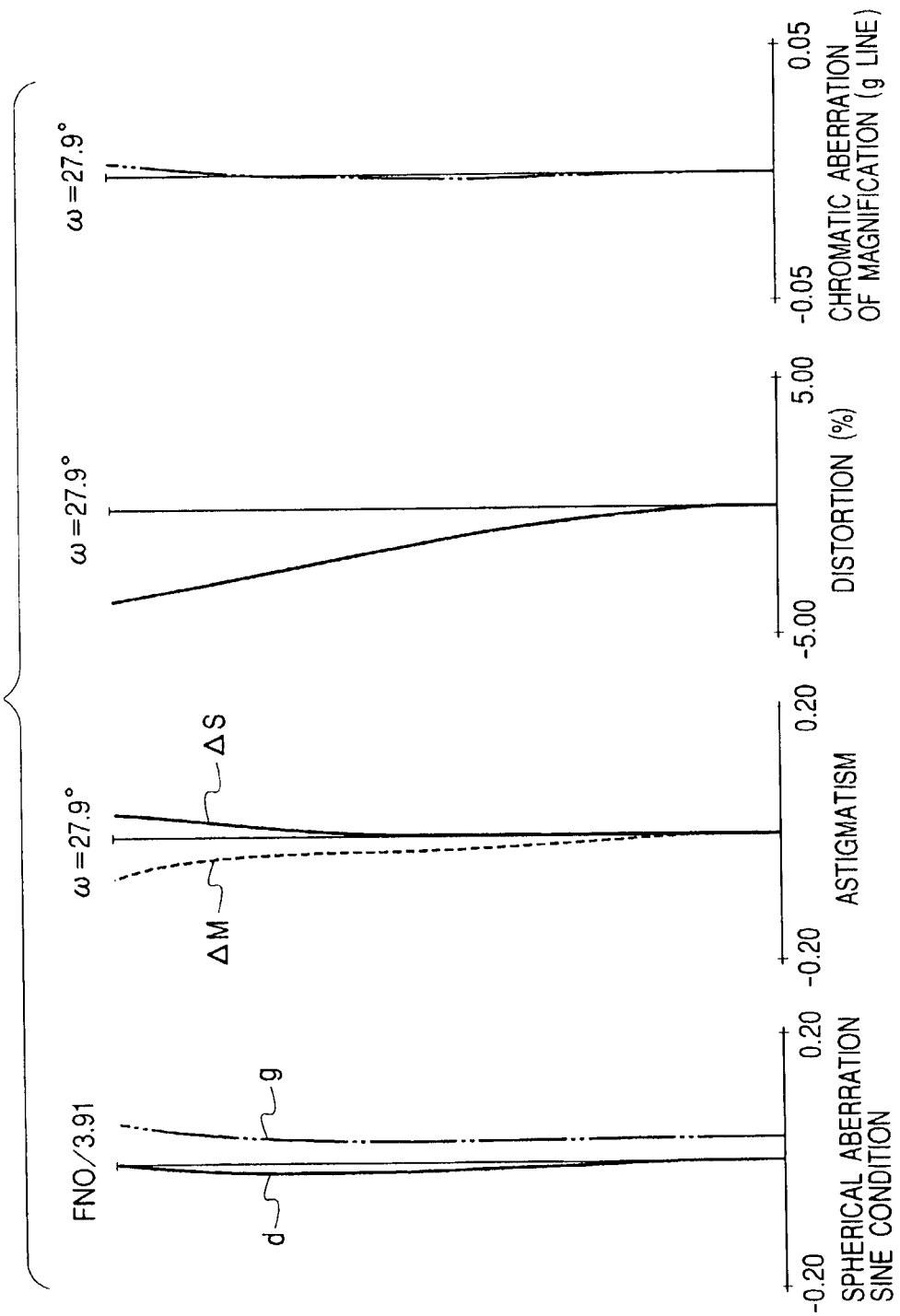
FIG. 10 is a diagram showing the aberration at the wide-angle end of the zoom lens of Embodiment 3.
Figure 11:
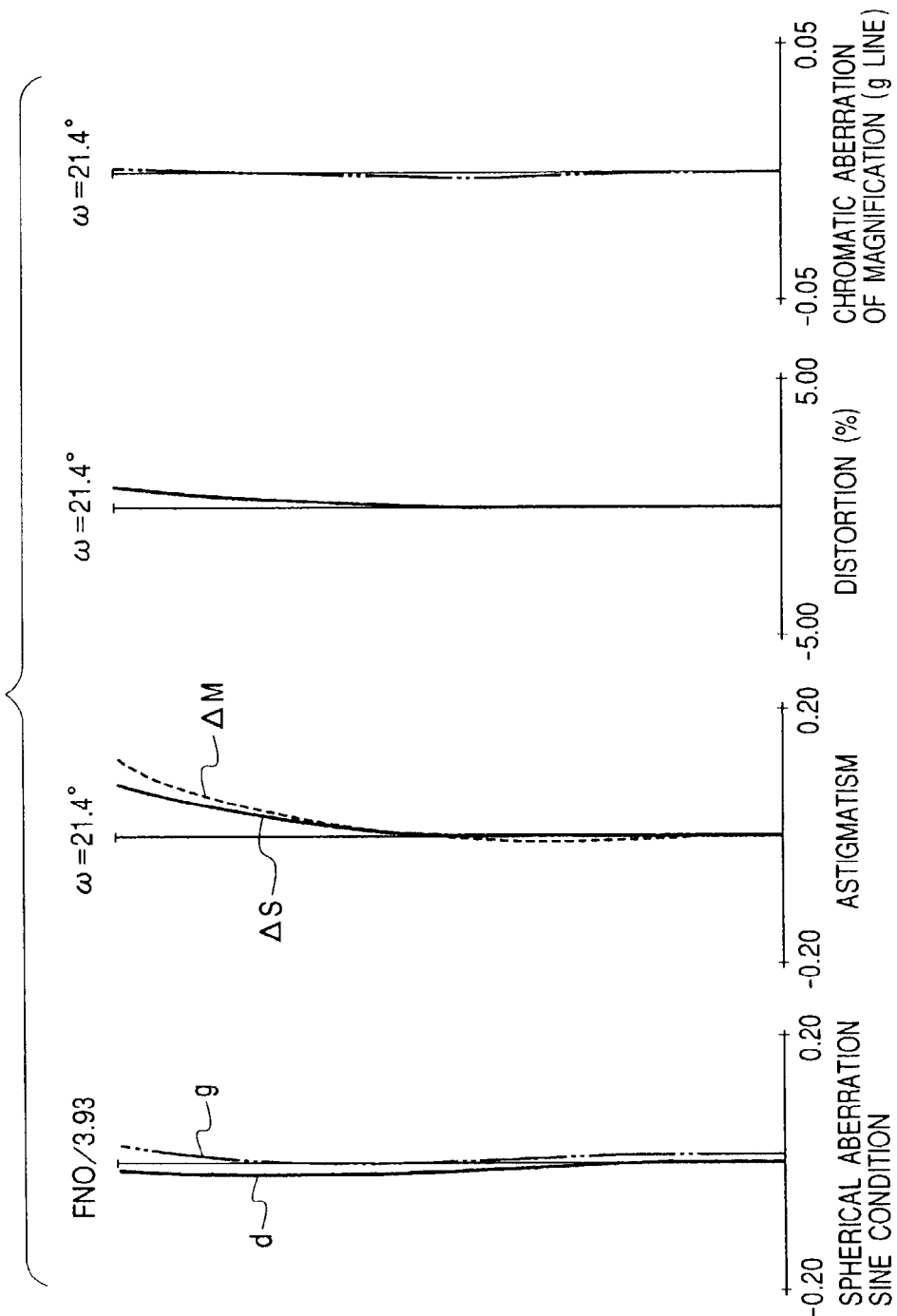
FIG. 11 is a diagram showing the aberration at the intermediate zooming position of the zoom lens of Embodiment 3.
Figure 12:
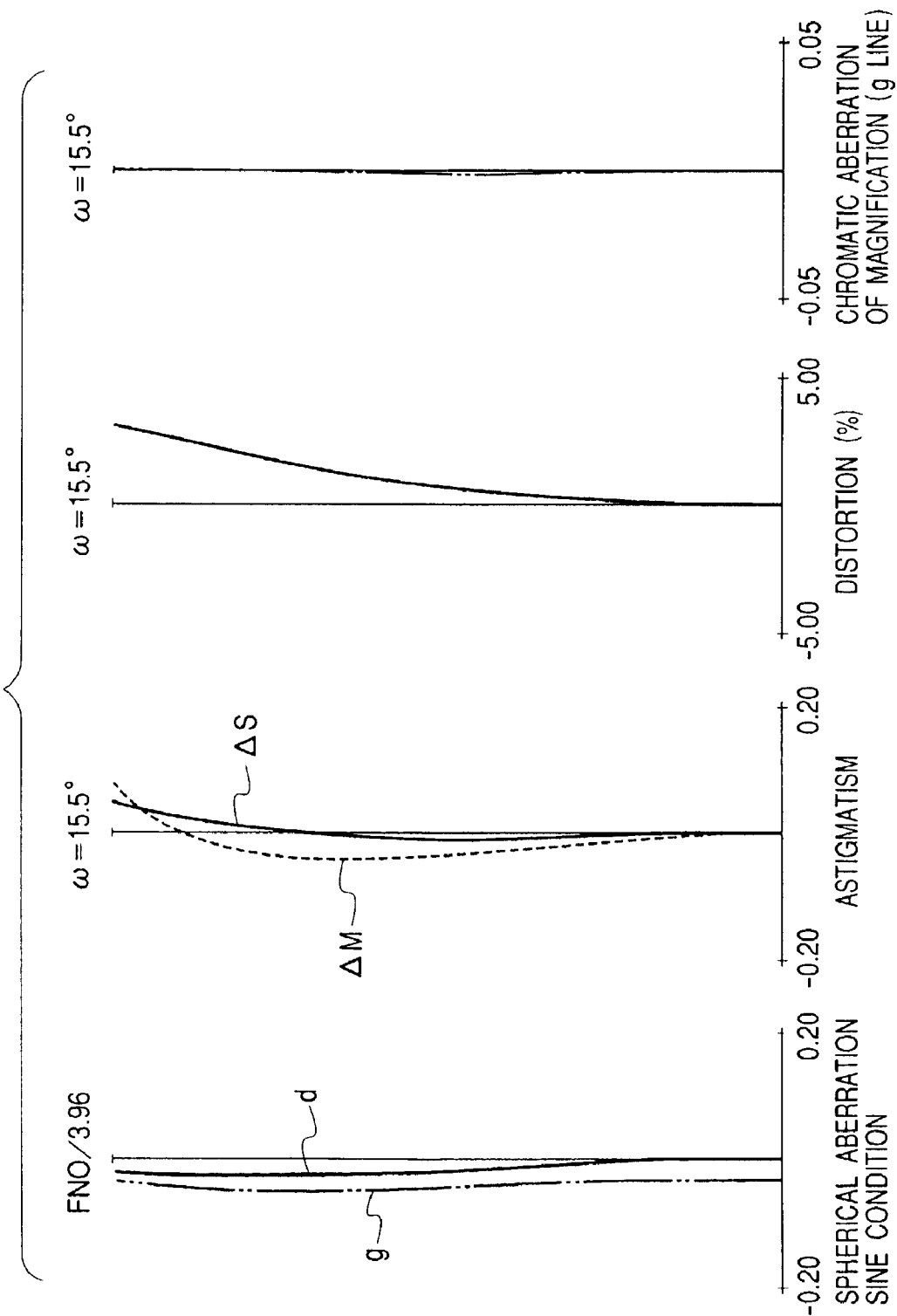
FIG. 12 is a diagram showing the aberration at the telephoto end of the zoom lens of Embodiment 3.

FIG. 9 is a sectional view showing a main portion of the zoom lens of Embodiment 3 of the present invention, and FIGS. 10 through 12 are diagrams showing the aberration at the wide-angle end, intermediate focal distance, and telephoto end of the zoom lens of Embodiment 3.

In each lens sectional view, numeral L1 indicates a first unit (first lens unit) of positive refractive power (optical power), numeral L2 indicates a second unit (second lens unit) of negative refractive power, numeral L3 indicates a third unit (third lens unit) of positive refractive power, and numeral L4 indicates a fourth unit (fourth lens unit) of positive refractive power. Symbol SP indicates an aperture stop, which is arranged in front of the third unit L3 and does not move in zooming. Symbol P indicates a glass block consisting of a color separation prism, face plate, filter or the like. Symbol IP indicates an image plane, where a solid-state imaging device, such as CCD or CMOS, and a photosensitive material, such as a film, are arranged.

In the aberration diagrams, symbols d and g respectively indicate the d-line and g-line, and symbols ΔM and ΔS respectively indicate a meridional image surface and a sagittal image surface, chromatic aberration of magnification being indicated by the g-line.

In each of the embodiments shown in the lens sectional views, the second unit L2 is moved toward the image plane for zooming from the wide-angle end to the telephoto end as indicated by an arrow, and the image plane fluctuation due to the zooming is corrected by moving the fourth unit L4 while partially having a convex locus on the object side.

Further, a rear focusing system is adopted in which focusing is effected by moving the fourth unit L4 along the optical axis. The solid curved line 4a and the broken curved line 4b of the fourth unit L4 shown in the drawing respectively indicate the movement loci (trace) for correcting the image plane fluctuation at the time of zooming from the wide-angle end to the telephoto end when focusing is being effected on an object at infinity and a nearby object. By thus moving the fourth unit L4 toward the object in a convex locus, the space between the third unit L3 and the fourth unit L4 is effectively utilized, thereby effectively achieving a reduction in the total length of the lens.

In each embodiment, when focusing is effected from an object at infinity to a nearby object at, for example, the telephoto end, the fourth unit L4 is moved forward as indicated by the straight line 4c of the drawing.

The first unit L1 and the third unit L3 are stationary for zooming and focusing to simplify the lens barrel structure and to obtain a lens barrel structure resistant to static pressure.

In Embodiment 1 shown in FIG. 1, the first lens unit L1, which is likely to involve a large lens diameter, is formed solely by one positive lens (G1) and one negative lens (G2), thereby realizing a reduction in the total lens length and the lens diameter. Further, the positive lens (G1) and the negative lens (G2) are arranged in that order from the object side, whereby the curvature of the positive lens G1 and the negative lens G2 is made gentler, and the production is facilitated.

In Embodiments 2 and 3 shown in FIGS. 5 and 9, the first lens unit L1, which is likely to involve a large lens diameter, is formed solely by one negative lens and one positive lens in that order from the object side, thereby achieving a reduction in the total lens length and lens diameter.

In each embodiment, the first lens unit has the lens surface nearest to the object convex toward the object and the lens surface nearest to the image concave toward the image.

By thus specifying the configuration of the first lens unit, an increase in distortion on the plus side at the large focal distance end (telephoto end) is restrained.

In each embodiment, the second lens unit L2 consists of a meniscus-like negative lens with its convex surface directed toward the object, a negative lens whose both sides are concave, and a positive lens which are joined together, whereby the fluctuation in aberration due to zooming is corrected in a satisfactory manner.

In Embodiments 1 and 2 shown in FIGS. 1 and 5, the third lens unit L3 is composed of a negative lens whose both sides are concave and a positive lens which is adjacent thereto on the object side and whose both sides are convex, whereby the correction of the chromatic aberration and spherical aberration and the correction of coma aberration are effected in a satisfactory manner.

Further, a positive lens is arranged on the image plane side of a negative lens whose both sides are concave to thereby effect the correction of aberrations in a more satisfactory manner.

In Embodiment 3 shown in FIG. 9, the third lens unit L3 is composed of a positive lens whose both sides are convex, another positive lens whose both sides are convex likewise, and a negative lens whose both sides are concave, whereby the aberrations, such as the spherical aberration and coma-aberration, are corrected in a satisfactory manner.

In Embodiment 1 shown in FIG. 1, the fourth lens unit L4 consists of a single positive lens which has the lens surface nearest to the image concave toward the image and the lens surface nearest to the object convex toward the object.

In Embodiments 2 and 3 shown in FIGS. 5 and 9, the fourth lens unit L4 consists of a single positive lens. In particular, it consists of a single positive lens whose both sides are convex, whereby a reduction in the total lens length is achieved.

In Embodiments 1, 2, and 3, it is also possible for the fourth lens unit L4 to be a junction lens consisting of a positive lens and a negative lens.

In each embodiment, the following conditions are satisfied:

$$1.60 < 1Gn < 1.84 \quad (1)$$

$$1.67 < 3Gn < 1.89 \quad (2)$$

$$0.12 < 4BD/3BD < 0.71 \quad (3)$$

$$0.42 < |f2|/LV < 0.91 \quad (4)$$

$$0.21 < f3/f4 < 2.34 \quad (5)$$

where 1Gn is the refractive index of the material of the positive lens of the first lens unit L1, 3Gn is the refractive index of the material of that positive lens of the third lens unit L3 which is nearest to the object, 3BD is the thickness of the third lens unit as measured on the optical axis, 4BD is the thickness of the fourth lens unit as measured on the optical axis, f2 is the focal distance of the second lens unit, LV is the distance between the first lens unit and the third lens unit, and f3 and f4 are respective focal distances of the third and fourth lens units.

Condition (1) pertains to the refractive index of the material of that positive lens of the first lens unit L1 which is nearest to the object. When the refractive index becomes higher than the upper limit, it ceases to be a material of low diffusion and the correction of chromatic aberration becomes difficult. More preferably, the upper limit is set to 1.81 or, further, 1.79. When the refractive index becomes lower than the lower limit, the sagittal image plane is in under with the intermediate image height, making it difficult to achieve high performance. It is more desirable that the lower limit be set to 1.67 or 1.71 or, further, 1.75.

Condition (2) pertains to the refractive index of the material of that lens (positive lens) of the third lens unit which is nearest to the object. When the refractive index becomes higher than the upper limit, the image plane is greatly curved toward the over side at the maximum focal distance end from the intermediate image height to the maximum image height, making it possible to achieve high performance. When the refractive index becomes lower than the lower limit, the sagittal image plane is in under at the intermediate image height, making it difficult to achieve high performance. It is more desirable that the lower limit be set to 1.74 or 1.78 or, further, 1.82.

Condition (3) pertains to the ratio in thickness between the lens units L3 and L4. When the upper limit is exceeded, the third lens unit L3 becomes too thin, and it becomes difficult to strike a balance between the correction of the spherical aberration and the correction of the field curvature aberration in the third lens unit L3; to correct the residual aberration in the fourth lens unit L4, the fourth lens unit L4 has to be formed by a large number of lenses, which is undesirable. More preferably, the upper limit is set to 0.57 or 0.45. When the thickness ratio becomes lower than the lower limit, the third lens unit L3 becomes too thick, making it difficult to achieve a reduction in the total length of the lens. More preferably, the lower limit is set to 0.14 or 0.16.

Condition (4) pertains to the ratio of the focal distance of the second lens unit L2 to the distance between the first lens unit L1 and the third lens unit L3. When the upper limit is exceeded, the negative refractive power of the second lens unit L2 is weakened, or the distance LV is diminished, making it impossible to obtain a sufficient zooming ratio. Preferably, the upper limit is set to 0.83 or, more preferably, at 0.76. When the ratio becomes lower than the lower limit, the negative refractive power of the second lens unit L2 is strengthened, or the distance LV increases. When the negative refractive power of the second lens unit L2 is strengthened, the deterioration in performance due to the unsharpened focus caused on one side when the second lens unit L2 is tilted is aggravated as a result of a production error, making it difficult to attain high image quality. When the distance LV increases, the total lens length increases. Preferably, the lower limit is set to 0.46 or, more preferably, at 0.51.

Condition (5) pertains to the ratio in focal distance between the third lens unit L3 and the fourth lens unit L4. When the refractive power of the fourth lens unit L4 becomes so large as to exceed the upper limit, the deterioration in performance due to the eccentricity of the fourth lens unit L4 moving at the time of zooming is aggravated, making it difficult to achieve high performance. Preferably, the upper limit is set to 1.87 or, more preferably, at 1.51. When the refractive power of the fourth lens unit L4 becomes so weak as to become lower than the lower limit, the movement stroke of the fourth lens unit L4 at the time of zooming or focusing increases, making it difficult to achieve a reduction in the length of the entire lens. Preferably, the lower limit is set to 0.27 or, more preferably, at 0.35.

Next, Numerical Embodiments 1 through 3 respectively corresponding to Embodiments 1 through 3 of the present invention will be shown. In the numerical embodiments, symbol i indicates the ordinal position of a surface as counted from the object side, symbol ri indicates the radius of curvature of each surface, symbol di indicates the thickness or air gap of the ith and the (i+1)th optical member, and symbols ni and vi indicate the refractive index and Abbe number of the ith optical member with respect to the d-line. Symbol f indicates focal distance, symbol FNo indicates F number, and symbol ω indicates half angle of view. The two surfaces nearest to the image consist of glass members, such as face plates. Table 1 shows the relationship between a part of the above conditions and the values in the numerical embodiments.

| Numerical Ebodiment 1 | | | |
|---|---|---|---|
| f = 6.45 – 12.34 | FNo = 1: 3.91 | 2ω = 54.5° –30.1° | |
| r 1 = 15.460 | d 1 = 3.32 | n 1 = 1.77250 | v 1 = 49.6 |
| r 2 = –89.443 | d 2 = 0.70 | n 2 = 1.84666 | v 2 = 23.9 |
| r 3 = 89.443 | d 3 = Variable | | |
| r 4 = 73.028 | d 4 = 0.50 | n 3 = 1.84666 | v 3 = 23.9 |
| r 5 = 5.608 | d 5 = 1.68 | | |
| r 6 = –18.288 | d 6 = 0.50 | n 4 = 1.60311 | v 4 = 60.6 |
| r 7 = 5.705 | d 7 = 2.40 | n 5 = 1.84666 | v 5 = 23.9 |
| r 8 = –57.038 | d 8 = Variable | | |
| r 9 = (diaphragm) | d 9 = 1.00 | | |
| r10 = 5.560 | d10 = 2.31 | n 6 = 1.83481 | v 6 = 42.7 |
| r11 = –13.475 | d11 = 0.21 | | |
| r12 = –6.581 | d12 = 1.20 | n 7 = 1.84666 | v 7 = 23.9 |
| r13 = 6.581 | d13 = 0.45 | | |
| r14 = –49.247 | d14 = 1.45 | n 8 = 1.80400 | v 8 = 46.6 |
| r15 = –5.920 | d15 = Variable | | |
| r16 = 10.774 | d16 = 1.14 | n 9 = 1.77250 | v 9 = 49.6 |
| r17 = 35.333 | d17 = Variable | | |
| r18 = ∞ | d18 = 2.21 | n10 = 1.51680 | v10 = 64.2 |
| r19 = ∞ | | | |

| | Focal distance | | |
|---|---|---|---|
| Variable gap | 6.45 | 8.78 | 12.34 |

-continued

| | | |
|---|---|---|
| d 3 | 0.60 | 3.66 | 6.72 |
| d 8 | 7.31 | 4.26 | 1.20 |
| d15 | 1.72 | 1.67 | 2.09 |
| d17 | 3.44 | 3.49 | 3.07 |

Numerical Embodiment 2

| | | | |
|---|---|---|---|
| f = 6.23 – 11.84 | FNo = 1: 3.91 – 3.99 | 2ω = 56.1° – 31.3° | |
| r 1 = 16.316 | d 1 = 0.70 | n 1 = 1.84666 | v 1 = 23.9 |
| r 2 = 11.335 | d 2 = 2.77 | n 2 = 1.80400 | v 2 = 46.6 |
| r 3 = 74.097 | d 3 = Variable | | |
| r 4 = 23.053 | d 4 = 0.50 | n 3 = 1.83400 | v 3 = 37.2 |
| r 5 = 4.849 | d 5 = 2.16 | | |
| r 6 = −11.431 | d 6 = 0.50 | n 4 = 1.48749 | v 4 = 70.2 |
| r 7 = 6.428 | d 7 = 1.88 | n 5 = 1.84666 | v 5 = 23.9 |
| r 8 = 114.773 | d 8 = Variable | | |
| r 9 = (diaphragm) | d 9 = 0.70 | | |
| r10 = 4.990 | d10 = 1.91 | n 6 = 1.70154 | v 6 = 41.2 |
| r11 = −3.997 | d11 = 1.87 | n 7 = 1.84666 | v 7 = 23.9 |
| r12 = 5.633 | d12 = 0.20 | | |
| r13 = 18.477 | d13 = 1.01 | N 8 = 1.84666 | v 8 = 23.9 |
| r14 = −16.287 | d14 = Variable | | |
| r15 = 25.923 | d15 = 1.26 | n 9 = 1.88300 | v 9 = 40.8 |
| r16 = −15.415 | d16 = Variable | | |
| r17 = ∞ | d17 = 2.21 | n10 = 1.51680 | v10 = 64.2 |
| r18 = ∞ | | | |

Focal distance

| Variable gap | 6.23 | 8.46 | 11.84 |
|---|---|---|---|
| d 3 | 0.49 | 3.33 | 6.17 |
| d 8 | 6.89 | 4.04 | 1.20 |
| d14 | 2.00 | 1.58 | 1.26 |
| d16 | 5.84 | 6.26 | 6.58 |

Numerical Embodiment 3

| | | | |
|---|---|---|---|
| f = 6.27 – 11.95 | FNo = 1: 3.91 – 3.96 | 2ω = 55.8° – 31.1° | |
| r 1 = 16.387 | d 1 = 0.70 | n 1 = 1.84666 | v 1 = 23.9 |
| r 2 = 11.546 | d 2 = 2.84 | n 2 = 1.80400 | v 2 = 46.6 |
| r 3 = 56.143 | d 3 = Variable | | |
| r 4 = 36.350 | d 4 = 0.50 | n 3 = 1.84666 | v 3 = 23.9 |
| r 5 = 4.652 | d 5 = 2.24 | | |
| r 6 = −10.299 | d 6 = 0.50 | n 4 = 1.51633 | v 4 = 64.1 |
| r 7 = 6.292 | d 7 = 2.37 | n 5 = 1.84666 | v 5 = 23.9 |
| r 8 = −37.952 | d 8 = Variable | | |
| r 9 = (diaphragm) | d 9 = 0.70 | | |
| r10 = 6.183 | d10 = 1.50 | n 6 = 1.88300 | v 6 = 40.8 |
| r11 = −38.045 | d11 = 0.31 | | |
| r12 = 7.826 | d12 = 1.49 | n 7 = 1.60562 | v 7 = 43.7 |
| r13 = −4.029 | d13 = 1.27 | n 8 = 1.84666 | v 8 + 23.9 |
| r14 = 4.000 | d14 = Variable | | |
| r15 = 24.927 | d15 = 1.66 | n 9 = 1.88300 | v 9 = 40.8 |
| r16 = −10.044 | d16 = Variabie | | |
| r17 = ∞ | d17 = 2.21 | n10 = 1.51680 | v10 = 64.2 |
| r18 = ∞ | | | |

Focal distance

| Variable gap | 6.27 | 8.48 | 11.95 |
|---|---|---|---|
| d 3 | 0.67 | 3.91 | 7.16 |
| d 8 | 7.62 | 4.37 | 1.13 |
| d14 | 3.08 | 2.60 | 2.21 |
| d16 | 3.18 | 3.67 | 4.05 |

TABLE 1

| | Numerical Embodiment 1 | Numerical Embodiment 2 | Numerical Embodiment 3 |
|---|---|---|---|
| (1) 1Gn | 1.7725 | 1.804 | 1.804 |
| (2) 3Gn | 1.835 | 1.702 | 1.883 |
| (3) 4BD/3BD | 0.20 | 0.25 | 0.36 |
| (4) \|f2\|/LV | 0.69 | 0.61 | 0.60 |
| (5) f3/f4 | 0.54 | 1.27 | 1.39 |

In each numerical embodiment, when applying the invention to a digital camera in which a solid-state imaging device is arranged in the image plane, an optical performance is adopted which is in conformity with a solid-state imaging device, such as CCD or CMOS, having a cell pitch of approximately 3 microns.

Next, an embodiment of a digital still camera using the zoom lens of the present invention as the photographing optical system will be described with reference to FIG. 13.

Figure 13:
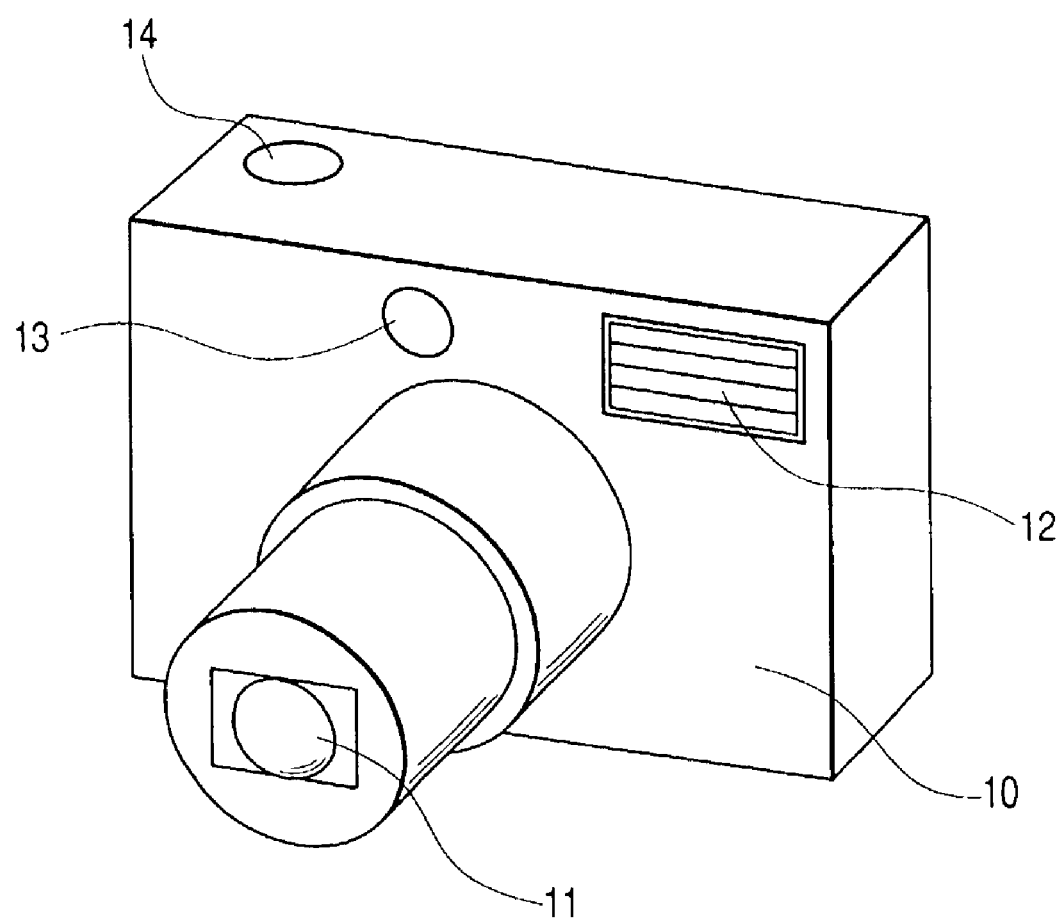
FIG. 13 is a schematic diagram showing a main portion of a digital still camera.

In FIG. 13, numeral 10 indicates a camera main body, numeral 11 indicates a photographing optical system formed of the zoom lens of the present invention, numeral 12 indicates a strobe contained in the camera main body, numeral 13 indicates an external type finder, and numeral 14 indicates a shutter button. The photographing optical system 11 forms an image of an object on the imaging surface of the solid-state imaging device (such as CCD or CMOS), which is not shown in the drawing. The solid-state imaging device converts image information received in form of light into an electric signal and outputs it.

By thus applying the zoom lens of the present invention to an optical apparatus, such as a digital still camera, an optical apparatus is realized which is small and has high optical performance.

What is claimed is:

1. A zoom lens comprising in order from an object side to an image side:
    a first lens unit having positive optical power, wherein the first lens unit does not move for zooming and consists of one positive lens and one negative lens arranged in order from the object side to the image side;
    a second lens unit having negative optical power, the second lens unit being movable for zooming;
    a third lens unit having positive optical power, the third lens unit not moving for zooming; and
    a fourth lens unit having positive optical power, the fourth lens unit being movable for zooming and consisting of a single positive lens.

2. A zoom lens according to claim 1, wherein a lens surface of the first lens unit nearest to the object side is convex toward the object side, and wherein a lens surface of the first lens unit nearest to the image side is concave toward the image side.

3. A zoom lens according to claim 1, wherein a lens surface of the fourth lens unit nearest to the object side is convex toward the object side, and wherein a lens surface of the fourth lens unit nearest to the image side is concave toward the image side.

4. A zoom lens according to claim 1, wherein a focal distance of the third lens (f3) and a focal distance of the fourth lens (f4) have a relation of $0.21 < f3/f4 < 2.34$.

5. A zoom lens according to claim 1, wherein a refractive index of a material of a positive lens of the first lens unit (1Gn) and a refractive index of a material of a positive lens of the third lens unit nearest to the object side (3Gn) range $1.60 < 1Gn < 1.84$; and $1.67 < 3Gn < 1.89$.

6. A zoom lens according to claim 1, wherein the lens unit includes a bi-concave negative lens and a bi-convex positive lens adjacent thereto on the object side.

7. A zoom lens according to claim 1, wherein a thickness of the third lens unit as measured on an optical axis (3BD), and a thickness of the fourth lens unit as measured on an optical axis (4BD) have a relation of $0.12<4BD/3BD<0.71$.

8. A zoom lens according to claim 1, wherein a focal distance of the second lens unit (f2) and a distance between the first lens unit and the third lens unit (LV) have a relation of $0.42<|f2|/LV<0.91$.

9. A zoom lens according to claim 1, wherein said zoom lens forms an image on a solid-state imaging device.

10. A zoom lens comprising in order from an object side to an image side:
   a first lens unit having positive optical power, wherein the first lens unit does not move for zooming and consists of one positive lens and one negative lens;
   a second lens unit having negative optical power, the second lens unit being movable for zooming;
   a third lens unit having positive optical power, the third lens unit not moving for zooming and having at least one negative lens and at least one positive lens; and
   a fourth lens unit having positive optical power, the fourth lens unit being movable for zooming,
   wherein the lens surfaces of the lenses of the first lens unit and the third lens unit are all spherical surfaces,
   and wherein a refractive index of a material of a positive lens of the first lens unit (1Gn) and a reflective index of a material of a positive lens of the third lens unit nearest to the object side (3Gn) range $1.60<1Gn<1.84$; and $1.74<3Gn<1.89$, respectively.

11. A zoom lens according to claim 10, wherein said zoom lens forms an image on a solid-state imaging device.

12. A zoom lens comprising in order from an object side to an image side:
   a first lens unit having positive optical power, wherein the first lens unit does not move for zooming and consists of one positive lens and one negative lens;
   a second lens unit having negative optical power, the second lens unit being movable for zooming;
   a third lens unit having positive optical power, the third lens unit not moving for zooming and including a bi-concave negative lens and a bi-convex positive lens adjacent thereto on the object side; and
   a fourth lens unit having positive optical power, the fourth lens unit being movable for zooming,
   wherein a thickness of the third lens unit represented by a distance between a lens surface closest to the image side of the third lens unit and a lens surface closest to the object side of the third lens unit as measured on an optical axis (3BD) and a thickness of the fourth lens unit represented by a distance between a lens surface closest to the image side of the fourth lens unit and a lens surface closest to the object side of the fourth lens unit as measured on an optical axis (4BD) have a relation of $0.12<4BD/3BD<0.57$.

13. A zoom lens according to claim 12, wherein said zoom lens forms an image on a solid-state imaging device.

14. A zoom lens comprising in order from an object side to an image side:
   a first lens unit having positive optical power, wherein the first lens unit does not move for zooming and consists of one positive lens and one negative lens;
   a second lens unit having negative optical power, the second lens unit being movable for zooming;
   a third lens unit having positive optical power, the third lens unit not moving for zooming; and
   a fourth lens unit having positive optical power, the fourth lens unit being movable for zooming,
   wherein, during zooming from the wide-angle end to the telephoto end, the fourth lens unit moves with tracing in a convex shape against the object side,
   wherein a focal distance of the second lens unit (f2), and a distance (LV) between a lens surface closest to the image side of the first lens unit and a lens surface closest to the object side of the third lens unit have a relation of $0.51<|f2|/LV<0.91$.

15. A zoom lens according to claim 14, wherein said zoom lens forms an image on a solid-state imaging device.

16. A camera comprising:
   a zoom lens according to claim 1; and
   a solid-state imaging device adapted to receive an image in form of light formed by the zoom lens.

17. A camera comprising:
   a zoom lens according to claim 10; and
   a solid-state imaging device adapted to receive an image in form of light formed by the zoom lens.

18. A camera comprising:
   a zoom lens according to claim 12; and
   a solid-state imaging device adapted to receive an image in form of light formed by the zoom lens.

19. A camera comprising:
   a zoom lens according to claim 14; and
   a solid-state imaging device adapted to receive an image in form of light formed by the zoom lens.

20. A zoom lens comprising in order from an object side to an image side:
   a first lens unit having positive optical power, wherein the first lens unit does not move for zooming and consists of one positive lens and one negative lens;
   a second lens unit having negative optical power, the second lens unit being movable for zooming;
   a third lens unit having positive optical power, the third lens unit not moving for zooming and having at least one negative lens and at least one positive lens; and
   a fourth lens unit having positive optical power, the fourth lens unit being movable for zooming, wherein said fourth lens unit moves with tracing in a convex shape against the object side during zooming from a wide-angle end to a telephoto end,
   wherein the lens surfaces of the lenses of the first lens unit are all spherical surfaces, and
   wherein a refractive index of a material of a positive lens of the first lens unit (1Gn) and a refractive index of a material of a positive lens of the third lens unit nearest to the object side (3Gn) range $1.60<1Gn<1.84$; and $1.78<3Gn<1.89$.

21. A zoom lens according to claim 20, wherein said zoom lens forms an image on a solid-state imaging device.

22. A camera comprising: a zoom lens according to claim 20; and a solid-state imaging device adapted to receive an image in form of light formed by the zoom lens.

* * * * *

UNITED STATES PATENT AND TRADEMARK OFFICE
CERTIFICATE OF CORRECTION

PATENT NO. : 7,106,521 B2
APPLICATION NO. : 10/255397
DATED : September 12, 2006
INVENTOR(S) : Hoshi It is certified that error appears in the above-identified patent and that said Letters Patent is hereby corrected as shown below:

<u>In The Claims</u>

In claim 6, (col. 8, line 65), please replace "the lens" with --the third lens--; and In claim 10, (col. 9, line 27), please replace "reflective" with --refractive--.

Signed and Sealed this

Twelfth Day of December, 2006

JON W. DUDAS
*Director of the United States Patent and Trademark Office*